Patented Nov. 5, 1940

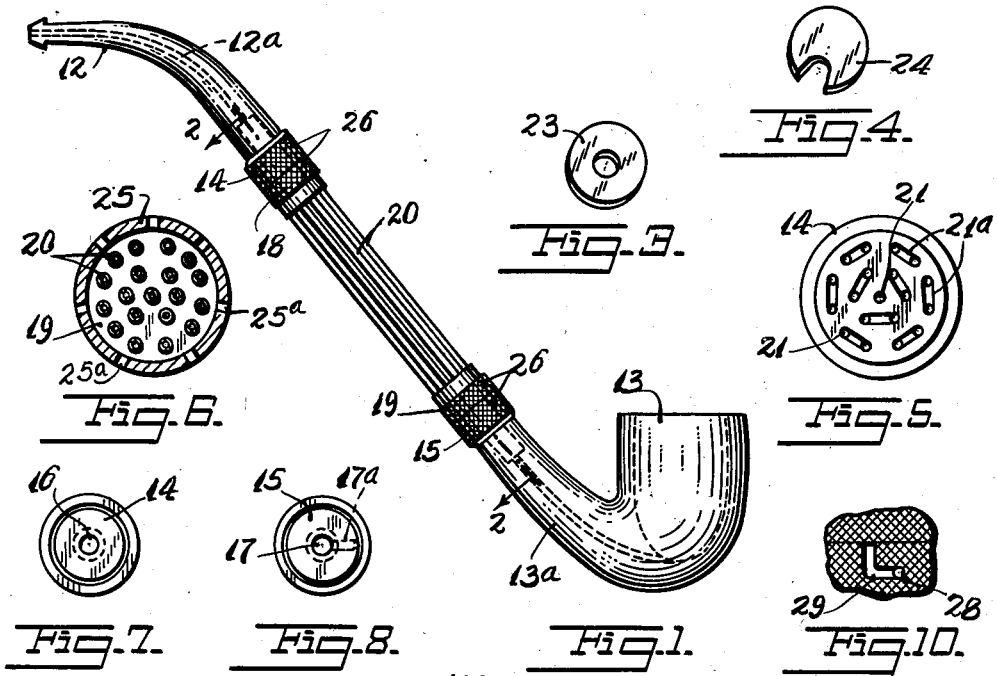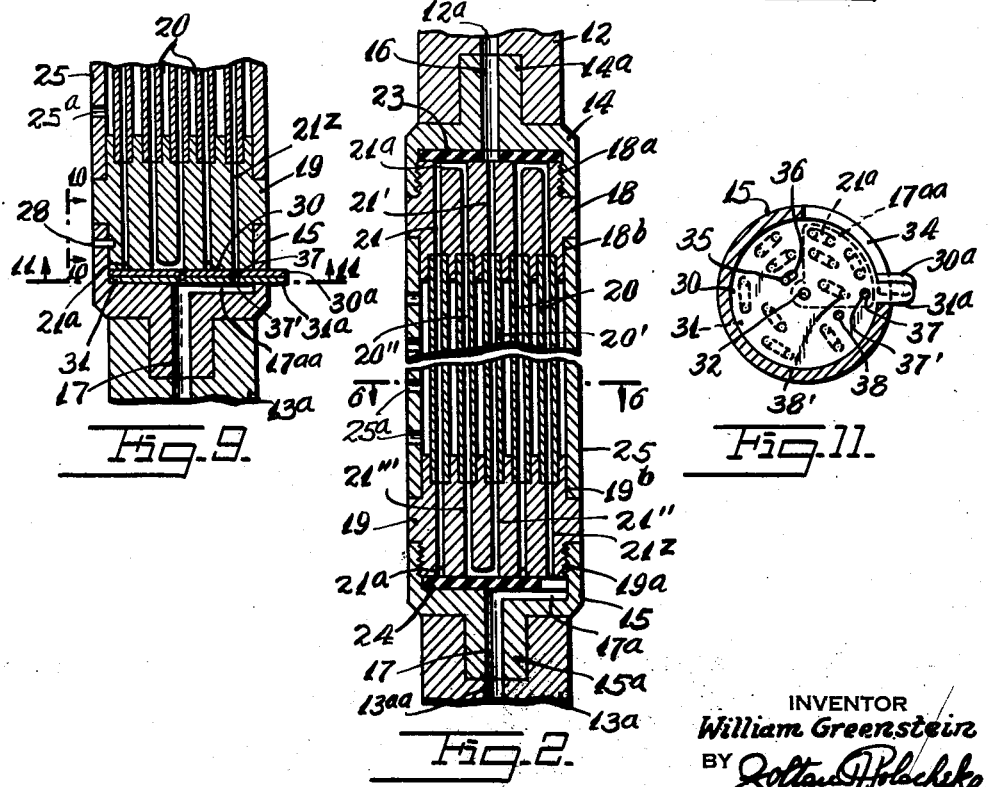

2,220,761

UNITED STATES PATENT OFFICE 2,220,761

MULTITUBE PIPE

William Greenstein, New York, N. Y.

Application September 19, 1939, Serial No. 295,573

7 Claims. (Cl. 131—218)

This invention relates to new and useful improvements in a multiple tube pipe.

The invention has for an object the construction of a pipe which is characterized by a mouth piece and bowl member with a stem section, and a novel connection between the mouth piece and stem section, which connection includes a multiple of tubes as hereinafter more fully described.

More specifically the invention proposed to provide bushings with axial passages, mounted on the adjacent ends of the mouth piece and stem section and associated with removable brackets which in turn support a plurality of tubes in a particular way.

More specifically the invention proposes to characterize the brackets by the fact that they support the tubes and by the fact that they have certain passages for connecting the tubes in a single series from the axial passages of the bushings previously mentioned.

Still further the invention proposes an arrangement whereby certain of the tubes may be cut out from the single series, so as to reduce the length of the path of the smoke.

Still further the invention proposes the construction of a multiple tube pipe as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a multiple tube pipe constructed in accordance with this invention.

Fig. 2 is a fragmentary enlarged sectional view taken on the line 2—2 of Fig. 1.

Fig. 3 is a perspective view of the top washer used in Fig. 2.

Fig. 4 is a perspective view of the bottom washer used in Fig. 2.

Fig. 5 is a plan view of the top bracket shown in Fig. 2.

Fig. 6 is a horizontal sectional view taken on the line 6—6 of Fig. 5.

Fig. 7 is an elevational view of the top bushing shown in Fig. 2 but illustrated to a reduced scale.

Fig. 8 is an elevational view of the bottom bushing shown in Fig. 2 but illustrated to a reduced scale.

Fig. 9 is a fragmentary sectional view similar to the lower portion of Fig. 2, but illustrating a modification of the construction.

Fig. 10 is a fragmentary elevational view looking in the direction of the line 10—10 of Fig. 9.

Fig. 11 is a horizontal sectional view taken on the line 11—11 of Fig. 9.

The multiple tube pipe in accordance with this invention includes a mouth piece 12 and a bowl member 13 provided with a stem section 13$^a$. Bushings 14 and 15 are mounted upon the adjacent ends of the mouth piece 12 and the stem section 13$^a$. More particularly the bushing 14 is engaged into the end of the mouth piece 12. This bushing 14 has a reduced end portion 14$^a$ which engages into a receiving opening in the stem 13$^a$. Moreover the bushing 14 is provided with an axial passage 16 which connects with the passage 12$^a$ of the mouth piece 12. The bushing 15 is provided with a reduced end 15$^a$ which engages into a receiving opening formed in the end of the stem section 13$^a$. The bushing 15 is provided with an axial passage 17 which connects with the passage 13$^{aa}$ of the stem section 13$^a$.

Brackets 18 and 19 are removably mounted on the adjacent ends of each of the bushings 14 and 15. The bracket 18 has a reduced portion 18$^a$ which threadedly engages into the end portion of the bushing 14. The bracket 19 has a reduced portion 19$^a$ which threadedly engages into the end portion of the bushing 15. A plurality of tubes 20 are mounted between the brackets 18 and 19.

Each of the brackets 18 and 19 is formed with a plurality of passages 21 connecting with the ends of the tubes 20 and extending to the remote end of the bracket. At the remote end each bracket has small transversely extending branch passages 21$^a$ which connect two of the passages 21. All of the passages are so arranged that the tubes 20 are connected in a single series. This series may be traced by starting with the air passage 21' in the bracket 18, which air passage is axially of the bracket and which connects with the axial passage 16 of the bushing 14. The passage 21 connects with the tube 20' which at its other end connects with the passage 21'' in turn connecting with the passage 21''' connecting with the tube 20''. In this way the tubes and passages are connected in a single series until the terminal passage 21$^z$. This terminal passage 21$^z$ is located at the offset area of the bracket 19. The passage 21$^z$ communicates with the passage 17ᵃ connecting with the axial passage 17 of the bushing 15.

A rubber washer 23 is interposed between the bushing 14 and the bracket 18 and assists in producing an air tight joint so that there is no leakage between the various branches 21ᵃ of the various passages. The washer 23 has a central opening which is aligned with the passages 16 and 21'. Another rubber washer 24 is interposed between the bushing 15 and the bracket 19 and acts against the end of the bracket 19 for preventing leakage between the various branch passages 21ᵃ. This washer 24 is formed with a peripheral opening which is aligned with the passage 21ˣ and the passage 17ᵃ. The brackets 18 and 19 are formed with recessed end portions 18ᵇ and 19ᵇ respectively forming end shoulders against which the ends of the tubular covering 25 is engaged. This tubular covering encases all of the tubes 20. The outside area of the bushings 14 and 15 and of the brackets 18 and 19 are formed with knurlings 26, see Fig. 1, which facilitates the manual gripping of these parts so that they may be separated when desired. The covering 25 is perforated at 25ᵃ or it may be omitted as shown in Fig. 1, to permit free circulation of the air at atmospheric temperature, between the separated tubes 20.

The operation of the device is as follows:

Tobacco is placed in the bowl 13 in the regular way. This tobacco is then lighted and smoked in the usual way by engaging the mouth piece 12 between the teeth. When one draws in the smoke from the tobacco it will first pass through the passage 13ᵃᵃ of the stem section 13 of the bowl member and then along the passage 17, the passage 17ᵃ, and the passage 17ˣ, and then zigzagging back and forth through the various tubes and finally reaching the passage 21', the passage 16', and the passage 12ᵃ of the mouth piece 12. This long path between the cooling pipes 20 which the smoke must necessarily take permits the smoke to cool so that the smoker may enjoy a cool smoke.

In Figs. 9 to 11 inclusive a modified form of the invention has been disclosed which distinguishes from the prior form in several respects. In this form the bushings and brackets of the multiple tube pipe are releasably connected together with bayonet slot and pins. More specifically each bracket is provided with a projecting pin 28 which engages into a bayonet slot 29 formed in the adjacent material of the adjacent bushing. The arrangement is such that the adjacent brackets and bushings may be relatively turned and manipulated to engage or disconnect these parts.

Another feature resides in the provision of a pair of discs 30 and 31 in face contact with each other and interposed between each adjacent bushing and bracket. The discs 30 and 31 are rotatively connected with each other by an axial pintle rivet 32. These discs are provided with projecting handle portions 30ᵃ and 31ᵃ, respectively, which extend out through a slot 34 formed in the material of the adjacent bushing. The discs 30 and 31 are capable of turning relative to each other through a small annular distance. This is so in that a pin 35 projects from one of the discs and engages into a short arcuate opening 36 formed in the other of the discs. The opening 36 is concentric with the pintle rivet 32.

In one position of the discs 30 and 31, with the pin 35 engaging one of the ends of the slot 30, a pair of openings 37 and 37' in the discs 30 and 31, respectively, align with each other. Another pair of openings 38 and 38' are out of alignment with each other. The aligned openings 37 and 37' may be selectively engaged with the passage 21ˣ or with one of several of the branch passages 5 21ᵃ. This may be accomplished by moving the discs 30 and 31 as a unit by engaging both of the handles 30ᵃ and 31ᵃ together. In the various positions of the discs 30 and 31 the aligned passages 37 and 37' register with the passage 17ᵃᵃ which in turn connects with the passage 17 of the adjacent bushing.

The handles 30ᵃ and 31ᵃ may be moved relative to each other to turn the discs 30 and 31 so that the openings 37 and 37' are moved out of registration, and then the openings 38 and 38' are moved into registration. This may be accomplished by moving the discs 30 and 31 so that the pin 35 engages the other end of the slot 36. In the new relative positions of the discs 30 and 31 they may be moved as a unit to align the aligned openings 38 and 38' with certain ones of the branch passages 21ᵃ.

In the different conditions of alignment of the passages 37 and 37', and 38 and 38' with the passages in the adjacent bracket, it is possible to vary the length of the path through which the smoke must pass. It should be recognized that the adjustment serves to cut off certain of the tubes 20. The arrangement is such that one or two or any number of tubes may be cut off from the series and so the length of the series varies. In this way the smoker may regulate the distance through which the smoke travels before reaching his mouth so as to control the temperature thereof to obtain a satisfactory smoke.

In other respects this form of the invention is identical to the prior form and the same parts may be recognized by the same reference numbers.

It is to be understood that this cooling stem may also be used with cigar or cigarette holders of any size and construction.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patents is:

1. A multiple tube pipe, comprising a mouthpiece, a bowl member with a stem section, a bushing with an axial passage mounted on each of the adjacent ends of said mouthpiece and stem section, a bracket removably mounted on the adjacent ends of each bushing and having passages connecting with said axial passages, a plurality of tubes mounted between said brackets, said brackets being formed with passages connecting said tubes in a single series with said axial passages, and a pair of discs turnably mounted on one of said bushings and interposed between one of said axial passages and said second named passages and having alignable openings for controlling the connection of certain of the second named passages with the said axial passage.

2. A multiple tube pipe, comprising a mouthpiece, a bowl member with a stem section, a bushing with an axial passage mounted on each of the adjacent ends of said mouthpiece and stem section, a bracket removably mounted on the adjacent ends of each bushing and having passages connecting with said axial passages, a plurality of tubes mounted between said brackets, said brackets being formed with passages connecting said tubes in a single series with said axial passages, and a pair of discs turnably mounted on one of said bushings and interposed between one of said axial passages and said second named passages and having alignable openings for controlling the connection of certain of the second named passages with the said axial passage, and means for limiting turning of said discs through a short distance relative to each other.

3. In a pipe, a multiple tube member interposed between the bowl and mouthpiece of said pipe and connected in the smoke passage for cooling the smoke passing therethrough, comprising a bushing with an axial passage mounted on each of the adjacent ends of said bowl and mouthpiece, a bracket removably mounted on each of the adjacent ends of said bushings and having passages continuing from said passages, a plurality of tubes mounted between said brackets, said brackets being formed with additional passages connecting together the ends of adjacent tubes forming a series with said passages, and means controlling the number of tubes connected in said series to vary the length of the passage through which the smoke must pass on its way from said bowl to said mouthpiece.

4. In a pipe, a multiple tube member interposed between the bowl and mouthpiece of said pipe and connected in the smoke passage for cooling the smoke passing therethrough, comprising a bushing with an axial passage mounted on each of the adjacent ends of said bowl and mouthpiece, a bracket removably mounted on each of the adjacent ends of said bushings and having passages continuing from said passages, a plurality of tubes mounted between said brackets, said brackets being formed with additional passages connecting together the ends of adjacent tubes forming a series with said passages, and means controlling the number of tubes connected in said series to vary the length of the passage through which the smoke must pass on its way from said bowl to said mouthpiece, comprising a pair of discs interposed between one of said axial passages and the adjacent ends of said additional passages, said discs having passages for connecting said additional passages with the adjacent axial passage and being turnable to close certain of said additional passages to eliminate certain of said tubes from said series to shorten the same.

5. In a pipe, a multiple tube member interposed between the bowl and mouthpiece of said pipe and connected in the smoke passage for cooling the smoke passing therethrough, comprising a bushing with an axial passage mounted on each of the adjacent ends of said bowl and mouthpiece, a bracket removably mounted on each of the adjacent ends of said bushings and having passages continuing from said passages, a plurality of tubes mounted between said brackets, said brackets being formed with additional passages connecting together the ends of adjacent tubes forming a series with said passages, and means controlling the number of tubes connected in said series to vary the length of the passage through which the smoke must pass on its way from said bowl to said mouthpiece, comprising a pair of discs interposed between one of said axial passages and the adjacent ends of said additional passages, said discs having passages for connecting said additional passages with the adjacent axial passage and being turnable to close certain of said additional passages to eliminate certain of said tubes from said series to shorten the same, said discs being disposed in face contact and arranged between the adjacent faces of one of said brackets and its adjacent bushing.

6. In a pipe, a multiple tube member interposed between the bowl and mouthpiece of said pipe and connected in the smoke passage for cooling the smoke passing therethrough, comprising a bushing with an axial passage mounted on each of the adjacent ends of said bowl and mouthpiece, a bracket removably mounted on each of the adjacent ends of said bushings and having passages continuing from said passages, a plurality of tubes mounted between said brackets, said brackets being formed with additional passages connecting together the ends of adjacent tubes forming a series with said passages, and means controlling the number of tubes connected in said series to vary the length of the passage through which the smoke must pass on its way from said bowl to said mouthpiece, comprising a pair of discs interposed between one of said axial passages and the adjacent ends of said additional passages, said discs having passages for connecting said additional passages with the adjacent axial passage and being turnable to close certain of said additional passages to eliminate certain of said tubes from said series to shorten the same, and means facilitating the turning of said discs to accomplish the aligning and disaligning of the passages formed in said discs.

7. In a pipe, a multiple tube member interposed between the bowl and mouthpiece of said pipe and connected in the smoke passage for cooling the smoke passing therethrough, comprising a bushing with an axial passage mounted on each of the adjacent ends of said bowl and mouthpiece, a bracket removably mounted on each of the adjacent ends of said bushings and having passages continuing from said passages, a plurality of tubes mounted between said brackets, said brackets being formed with additional passages connecting together the ends of adjacent tubes forming a series with said passages, and means controlling the number of tubes connected in said series to vary the length of the passage through which the smoke must pass on its way from said bowl to said mouthpiece, comprising a pair of discs interposed between one of said axial passages and the adjacent ends of said additional passages, said discs having passages for connecting said additional passages with the adjacent axial passage and being turnable to close certain of said additional passages to eliminate certain of said tubes from said series to shorten the same, and a projecting pin on one of said discs engaging a complementary arcuate slot in the other of said discs for limiting the movement of one disc relative to the other.

WILLIAM GREENSTEIN.